(12) United States Patent
Beaudry et al.

(10) Patent No.: US 9,080,060 B2
(45) Date of Patent: Jul. 14, 2015

(54) WATER-BASED COATING SYSTEM WITH IMPROVED ADHESION TO A WIDE RANGE OF COATED AND UNCOATED SUBSTRATES INCLUDING MUFFLER GRADE STAINLESS STEEL

(71) Applicant: Valspar Sourcing, Inc., Minneapolis, MN (US)

(72) Inventors: Channing C. Beaudry, Coon Rapids, MN (US); Donald W Boespflug, Lino Lakes, MN (US); Wylie H Wetzel, Woodbury, MN (US); Walter J Blatter, Woodbury, MN (US); Feng Zhang, Shanghai (CN); T. Howard Killilea, North Oaks, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 13/863,482

(22) Filed: Apr. 16, 2013

(65) Prior Publication Data

US 2013/0245183 A1 Sep. 19, 2013

Related U.S. Application Data

(63) Continuation of application No. PCT/US2011/057027, filed on Oct. 20, 2011.

(60) Provisional application No. 61/394,992, filed on Oct. 20, 2010.

(51) Int. Cl.
| | |
|---|---|
| *B05D 1/36* | (2006.01) |
| *C09D 5/00* | (2006.01) |
| *C09D 5/08* | (2006.01) |
| *B05D 7/14* | (2006.01) |
| *B05D 5/00* | (2006.01) |
| *C09D 5/02* | (2006.01) |

(52) U.S. Cl.
CPC .. *C09D 5/00* (2013.01); *B05D 1/36* (2013.01); *B05D 5/00* (2013.01); *B05D 7/14* (2013.01); *C09D 5/028* (2013.01); *C09D 5/08* (2013.01); *C09D 5/082* (2013.01); *C09D 5/084* (2013.01); *B05D 2202/15* (2013.01)

(58) Field of Classification Search
CPC .......... C09D 5/08; C09D 5/082; C09D 5/084; B65D 7/42
USPC ............................. 427/230–239, 407.1, 408; 106/14.05–14.45
See application file for complete search history.

(56) References Cited

U.S. PATENT DOCUMENTS

| | | |
|---|---|---|
| 4,018,966 A | 4/1977 | Antlfinger |
| 4,128,519 A | 12/1978 | Bartoszek |
| 4,228,264 A | 10/1980 | Yamamoto |
| 4,328,143 A | 5/1982 | Izumi et al. |
| 4,415,698 A | 11/1983 | Fan |
| 4,425,465 A | 1/1984 | Padget |
| 4,435,478 A | 3/1984 | Burgess |
| 4,719,038 A | 1/1988 | Sobata et al. |
| 4,837,253 A | 6/1989 | Mansell et al. |
| 4,945,134 A | 7/1990 | Wallace |
| 5,039,751 A | 8/1991 | Wallace |
| 5,218,031 A | 6/1993 | Nayder et al. |
| 5,262,464 A | 11/1993 | Koevenig |
| 5,476,890 A | 12/1995 | Heiss |
| 6,010,563 A | 1/2000 | Taketani |
| 6,758,887 B2 | 7/2004 | Bhatia |
| 8,746,164 B2 | 6/2014 | Molz et al. |
| 2007/0282027 A1 | 12/2007 | Fujimoto |
| 2007/0295019 A1* | 12/2007 | Peng et al. ...................... 62/239 |
| 2009/0042042 A1 | 2/2009 | Yuki et al. |
| 2009/0054583 A1 | 2/2009 | Fringant |
| 2009/0098395 A1 | 4/2009 | Lu |
| 2012/0298657 A1* | 11/2012 | Wessels et al. ................ 220/1.5 |
| 2014/0170426 A1 | 6/2014 | Thorlaksen |

FOREIGN PATENT DOCUMENTS

| | | |
|---|---|---|
| CN | 101760749 A | 6/2010 |
| EP | 80303804.1 A1 | 10/1980 |
| EP | 0264655 A3 | 4/1988 |
| EP | 0268042 A3 | 5/1988 |
| EP | 0391343 A3 | 10/1990 |
| EP | 1148084 | 10/2001 |
| EP | 1151854 A1 | 11/2001 |

(Continued)

OTHER PUBLICATIONS

PCT International Search Report, Application No. PCT/US2011/057040 filed Oct. 20, 2011.
Burgess, A.J., Caldwell, D. and Padget, J.C., A New Approach to the Design of Latex Paints for the Protection of Steel, J. Oil Col. Chem. Assoc. 1981, 64, 175-185, ICI Mond Division, Runcorn Heath, Ceshire WA7 4QF, England.
Office Action from U.S. Patent and Trademark Office for U.S. Appl. No. 13/716,695, mail date Aug. 29, 2014.
Supplemental European Search Report for European Application No. 11845062 mailed on Apr. 11, 2014.

(Continued)

*Primary Examiner* — William Phillip Fletcher, III

(57) ABSTRACT

The present invention provides a water-based coating system that can be used to form a durable, abrasion resistant, tough, protective coating on a wide range of substrates. The coating system advantageously has excellent adhesion properties and can be directly coated onto stainless steel surfaces without requiring an intervening primer layer. Primer layers or other types of coatings can be used in combination with the coating system of the present invention if desired, however. The coating system is particularly effective for protecting metal-containing substrates such as intermodal, refrigerated cargo containers. The resultant coatings are flexible and impact resistant. Being water-based, the coating compositions have lower VOC emissions and less residual odor than solvent-based compositions.

6 Claims, 1 Drawing Sheet

(56) References Cited

FOREIGN PATENT DOCUMENTS

| | | | |
|---|---|---|---|
| JP | 9328672 | A1 | 12/1997 |
| JP | 2000256617 | A | 9/2000 |
| JP | 2010-070603 | A * | 2/2010 |
| JP | 2010070603 | A | 4/2010 |
| JP | 2010131897 | A | 6/2010 |
| JP | 201168657 | A | 9/2011 |
| KR | 10-2004-005616 | | 8/2006 |
| WO | WO 2008/130943 | A2 * | 10/2008 |
| WO | WO2009057104 | A2 | 5/2009 |
| WO | 2009141559 | | 11/2009 |

OTHER PUBLICATIONS

Office Action from U.S. Patent and Trademark Office for U.S. Appl. No. 13/452,538 mail date Mar. 26, 2015.

* cited by examiner

WATER-BASED COATING SYSTEM WITH IMPROVED ADHESION TO A WIDE RANGE OF COATED AND UNCOATED SUBSTRATES INCLUDING MUFFLER GRADE STAINLESS STEEL

CROSS-REFERENCE TO RELATED APPLICATION(S)

This application is a continuation-in-part of PCT Application No. PCT/US2011/057027, filed Oct. 20, 2011, and claims priority to U.S. Provisional Application Ser. No. 61/394,992 filed 20 Oct. 2010.

FIELD OF INVENTION

The present invention relates to water-based coating systems used to form protective coatings on substrates and in particular, metal-containing substrates. More particularly, the present invention relates to coating systems involving a water-based top coating compositions having not only improved adhesion characteristics to a wide range of substrates including muffler grade stainless steel, but also application characteristics allow these water-based compositions to provide coatings with significantly reduced defects.

BACKGROUND OF THE INVENTION

Intermodal cargo containers (also referred to as freight or shipping containers) are reusable transport and storage units for moving products and raw materials between locations, including between countries. Intermodal cargo containers are standardized to facilitate intermodal transport such as among marine transport, freight train transport, and freight truck transport. Standardization of cargo containers also is referred to as containerization.

Containerization has provided global commerce with many benefits. Shipped goods move more easily and cheaply. Manufacturers know that goods loaded at one location can be readily unloaded at the destination. Cargo security has been improved, as containers are usually sealed and can be locked to discourage tampering and theft. Containers also have a longer service life, and there is a stronger market for used containers. Additionally, the costs of cargo containers themselves is lowered because a manufacturer can make these in larger volume knowing that potential customers are available all over the world.

Several international standards have been created to promote international containerization. For instance, the International Organization for Standardization (ISO) has promulgated applicable standards including R-668 to define terminology, dimensions, and ratings; R-790 to define identification markings; R-1161 to recommend corner fittings; and R-1897 to set forth dimensions for general purpose containers. Other standards include ASTM D5728-00, ISO 9897 (1997); ISO 14829 (2002); ISO 17363 (2007); ISO/PAS 17712 (2006); ISO 18185 (2007); and ISO/TS 10891 (2009). An international specification for coating/paint performance is provided by IICL (Institute of International Container Lessors). See also International Organization for Standardization (ISO), Freight Containers, Vol. 34 of ISO Standards Handbook, 4$^{th}$ Ed., 2006, ISBN 92-67-10426-8; and Levinson, Marc, The Box: How the Shipping Container Made the World Smaller and the World Economy Bigger, Princeton, N.J., Princeton University Press, 2006, ISBN 0691123241. Each of these standards and publications is incorporated herein in its entirety for all purposes.

Cargo containers experience harsh, corrosive environments during their service life. When shipped by sea, the containers are exposed to the corrosive effects of salt water. When exposed to nature, the containers must withstand wind, sun, hail, rain, sand, heat, and the like. Containers exposed to the sun can bake to temperatures of 82° C. (180° F.) or even higher.

Accordingly, cargo containers must be made in a way that allows the containers to survive this exposure for a reasonable service life. As one strategy, containers can be made from corrosion resistant materials such as stainless steel, weathering steel (also known as weather steel, COR-TEN brand steel, or CORTEN brand steel). For example, a refrigerated cargo container is a type of intermodal cargo container used in intermodal freight transport that is refrigerated for the transportation of temperature-sensitive cargo. A typical refrigerated cargo container includes a steel frame and steel wall panels welded to the frame. In one embodiment, the frame of a refrigerated cargo container may be made from weathering steel, while the wall panels are made from a stainless steel such as muffler grade stainless steel. The frame often is protected against corrosion such as by galvanizing the frame or coating the frame with a Zn-containing primer. The frame is then further protected with a waterproof barrier. Often, a two-part epoxy coating is used to coat the frame. The epoxy coating is then topcoated as uncoated epoxy tends to degrade in sunlight. The stainless steel wall panels are sufficiently corrosion-resistant that it is not strictly necessary to apply protective coatings to the stainless steel. It nonetheless often is desirable to apply a coating to the stainless steel in order to provide decoration, trademark indicia, bar code information, and other indicia.

Historically, mostly solvent-based coating systems have been used to protect cargo containers as many proposed water-based systems have been unable to satisfy the applicable performance demands and/or standards. It has been very difficult to formulate water-based coating systems that show acceptable adhesion when applied directly to stainless steel. Water-based coatings also tend to have greater problems with respect to sagging, leveling, cratering, and cracking. Consequently, only solvent-based coating systems have found widespread commercial acceptance in the industry. The container industry retains a strong bias against using water-based coating systems.

With increased environmental awareness, there is a strong desire to develop improved technology that would allow use of water-based coating systems to protect cargo containers or other substrates. The industry strongly desires a commercially available, water-based coating system that is able to satisfy the stringent demands of the intermodal cargo container industry, particularly when used to coat stainless steel substrates.

SUMMARY OF THE INVENTION

The present invention provides a water-based coating system that can be used to form a durable, abrasion resistant, tough, protective coating on a wide range of substrates. The coating system advantageously has excellent adhesion properties and can be directly coated onto stainless steel surfaces without requiring an intervening primer layer. Primer layers or other types of coatings can be used in combination with the coating system of the present invention if desired, however. The coating system is particularly effective for protecting metal-containing substrates such as intermodal, refrigerated cargo containers. The resultant coatings are flexible and impact resistant. Being water-based, the coating compositions have lower VOC emissions and less residual odor than solvent-based compositions.

The coating system of the present invention generally includes an aqueous coating composition that is useful to form durable, abrasion resistant, tough top coatings over a wide range of substrates. Significantly, the aqueous coating composition provides water-based top coatings with enhanced compatibility for not only underlying primer coatings, such as those incorporating epoxy resins or the like, but also for uncoated substrates such as bare stainless steel. When these aqueous coating compositions are applied directly onto stainless steel surfaces (such as muffler grade stainless steel), the resultant top coats shows excellent resistance to blistering, less peeling, great durability and excellent adhesion. This makes the compositions very useful for directly coating stainless steel surfaces of intermodal cargo containers. The compositions are particularly suitable for use on refrigerated cargo containers, which typically contain multiple kinds of surfaces to be coated. These surfaces include stainless steel.

The advantages of the present invention are provided by an aqueous coating composition comprising a resin component that includes one or more film forming resins. Desirably, the film forming resin either is film forming on its own or can be caused to be film forming, such as if the resin were used in combination with coalescing aid(s), heat, and/or the like. The resin(s) are used in combination with one or more non-binder pigments that cumulatively are present in significant amounts as described further below. The pigment content helps to provide improved adhesion as well as improved application characteristics. The pigments also may serve other functions in the coating. By way of example, pigments may serve as thickeners.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein.

DETAILED DESCRIPTION OF PRESENTLY PREFERRED EMBODIMENTS

Figure 1:
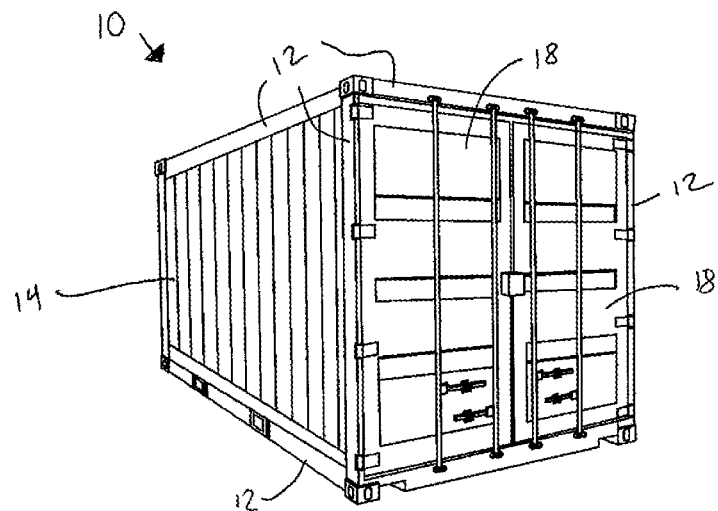
FIG. 1 is a perspective view of a refrigerated cargo container used in intermodal freight transport showing an end of the container containing the access doors.

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention. All patents, pending patent applications, published patent applications, and technical articles cited herein are incorporated herein by reference in their respective entireties for all purposes.

The aqueous coating composition of the invention may be a single phase solution in which one or more ingredients including at least the resin component are substantially fully dissolved in the aqueous carrier. Alternatively, the coating compositions may include two or more phases. Compositions including two or more phases may be in the form of dispersions such as a dispersion in which one or more phases are dispersed in a continuous phase of another material and/or phase. Many dispersions are in the form of suspensions including but not limited to colloidal suspensions. In some embodiments, coating compositions are in the form of a latex or emulsion including polymer microparticles dispersed in an aqueous carrier. As used herein, a "latex" polymer means that a polymer is in admixture with an aqueous carrier with the help of at least one emulsifying agent (e.g., a surfactant) for creating an emulsion of polymer particles in the carrier. Some compositions may be water-reducible meaning that the composition remains stable if diluted with additional amounts of water. For water-reducible compositions, some embodiments use at least one polymer that is capable of being dispersed in water without requiring the use of a separate surfactant, although separate surfactants could be used if desired. Polymers that can be dispersed in water without requiring a separate surfactant often include pendant ionic functionality and/or hydrophilic chain segments that render corresponding regions of the polymer to be more compatible with water. External acids or bases may be required for anionic stabilization, but such acids and bases usually are different than the emulsifying agents (e.g., surfactants) that are used to disperse a latex polymer.

The resin(s) useful in the resin component may be thermosetting and/or thermoplastic. Conveniently, one or more of these are thermoplastic. Further, some embodiments of a thermoplastic resin useful in the practice of the present invention may be amorphous, crystalline or semicrystalline. Illustrative resins used in the resin component include acyclic, cyclic, branched, linear, aliphatic, or aromatic resins. Thermoplastic resins desirably have a minimum film forming temperature (MFFT) that is below about 50° C., preferably below about 30° C., more preferably below about 20° C. It is also desirable that such resins desirably have a minimum film forming temperature that is greater than about −50° C., preferably greater than −25° C., more preferably greater than about 0° C.

The molecular weight(s) of the one or more resins independently may vary over a wide range and preferably are obtained by emulsion polymerization. The number average molecular weight desirably is in the range from about 5000 to 100,000, more preferably about 10,000 to 75,000. The weight average molecular weight desirably is in the range from about 10,000 to 200,000, more preferably about 20,000 to 125,000. As used herein, molecular weight refers to the number average molecular weight unless otherwise expressly noted.

The amount of resin component in the aqueous coating composition may be selected from a wide range. Generally, if the amount of resin component is too low, then it may be difficult to form a film, more difficult to form a film that has sufficient adhesion to the substrate, the film may have insufficient corrosion resistance or other performance, and/or the like. If too much is used, then it may be harder to formulate a pigmented system or it may be more difficult to make a material that can be applied to the substrate. Balancing such concerns, the first aqueous coating composition preferably includes from about 10 to 80 weight percent, more preferably about 15 to 50 weight percent, and most preferably about 20 to 40 weight percent of the first resin component based on the total weight of the aqueous coating composition.

In some preferred modes of practice, the resin component includes at least one resin having acid functionality (or salt(s) or ester(s) thereof). The acid functionality (if any) of the resin(s) may be pendant directly from the polymer backbone or may be linked to the backbone by a suitable linking group.

Examples of suitable acid functionality include carboxylic acid, sulfonic acid, phosphonic acid, combinations of these and the like. A wide variety of counter cations may be used in those embodiments in which the acid group is supplied as a salt. Examples of such cations include $Na^+$, $Li^+$, $NH_4^+$, $K^+$, combinations of these, and the like. In preferred embodiments, the acid functionality includes —$C(O)ONH_4+$. Advantageously, when coating compositions including these moieties dry, the dried coatings release ammonia, leaving —C(O)OH functionality in the dried coating.

The reactants used to form the acid functional resin(s) preferably include monomers, oligomers, and/or resins having free radically polymerizable functionality. Representative examples of free radically polymerizable functionality include (meth)acrylate groups, olefinic carbon-carbon double bonds, allyloxy groups, alpha-methyl styrene groups, (meth) acrylamide groups, cyanate ester groups, (meth)acrylonitrile groups, vinyl ethers groups, combinations of these, and the like. The term "(meth)acryl", as used herein, encompasses acryl and/or methacryl unless otherwise expressly stated.

Free radically polymerizable functionality is conveniently reacted by exposing the reactants to a suitable source of curing energy, often in the presence of agents (e.g., initiators, etc.) that help promote the desired reaction. The energy source used for achieving polymerization and/or crosslinking of the curable functionality may be actinic (e.g., radiation having a wavelength in the ultraviolet or visible region of the spectrum), accelerated particles (e.g., electron beam radiation), thermal (e.g., heat or infrared radiation), or the like.

In addition to acid functionality and free radically polymerizable functionality, the reactants used to make resins may otherwise be substituted or unsubstituted with additional kinds of functionality. Such functionality optionally may be used for crosslinking. As an additional option, such functionality may be used to provide the resin with integral dispersing functionality. Some substituents may be co-members of a ring structure. Examples of other substituents include hydroxyl, thiol, amino, amide, isocyanate, nitrile, carboxy, sulfate, sulfite, fatty acid, epoxide, and combinations of these groups. Examples of such comonomers include glycidyl (meth)acrylate and acrylate, methylaminoethyl (meth)acrylate and acrylate, (meth)acrylic, t-butylaminoethyl (meth)acrylate and acrylate, (meth)acrylamide, 4-pentanoguanamine, hydroxylalkyl esters such as hydroxypropyl (meth)acrylate, hydroxyethyl (meth)acrylate and hydroxyethyl acrylate, (meth)acrylonitrile, N-alkoxyalkyl amides such as methoxymethyl (meth)acrylamide and butoxy-(methyl) acrylamide, and hydroxyalkyl amides such as N-methylol (meth)acrylamide and N-methylol acrylamide, and dicarboxylic acids such as maleic acid, corresponding anhydrides of these (if any), combinations of these, and the like.

The acid-functional resin desirably is a copolymer derived from co-polymerizable reactants including at least (a) at least one aromatic reactant including pendant free radically polymerizable functionality; (b) at least one free radically polymerizable reactant having pendant acid functionality(ies) (or salt(s) or esters thereof); and (c) at least one other copolymerizable, aliphatic reactant with free radically polymerizable functionality.

Examples of reactant (a) include styrene, alpha-methyl styrene, t-butyl styrene, 1,3-diisopropenylbenzene, 2,4,6-trimethylstyrene, 2,4-dimethylstyrene, 2,4-diphenyl-4-methyl-1-pentene, 2,5-dimethylstyrene, 2-vinylnaphthalene, 3-methylstyrene, 4-benzyloxy-3-methoxystyrene, 9-vinylanthracene, $\alpha$,2-dimethylstyrene, combinations of these, and the like. These may be substituted or non-substituted. Illustrative embodiments of the resin include from about 10 to 70 parts by weight of reactant(s) (a) per about 100 parts by weight of the reactants used to form the resin.

Examples of reactant (b) include unsaturated or other free radically polymerized acids (or anhydrides thereof). In many embodiments, reactant (b) is provided by one or more carboxylic acids or anhydrides thereof having one or more acid groups. Examples include (meth)acrylic acid, sorbic acid, maleic anhydride, maleic acid, palmitoleic acid, oleic acid, linoleic acid, arachidonic acid, benzoic acid, fumaric acid, crotonic acid, itaconic acid, corresponding anhydrides of these (if any), combinations of these, and the like. Illustrative embodiments of the resin include from about 0.2 to 20 parts by weight of reactant(s) (b) per about 100 parts by weight of the reactants used to form the resin. Preferably, the acid functionality is atypically high in that the one or more acid functional reactants incorporated into the resin are at least 3 weight percent, at least 4 weight percent, at least 5 weight percent, and up to 10, or 15, or 20 weight percent of total weight of all reactants used to make the resin.

Examples of reactant (c) include vinyl esters, vinyl ethers, lactams such as N-vinyl-2-pyrrolidone, (meth)acrylamide, N-substituted (meth)acrylamide, octyl (meth)acrylate, nonylphenol ethoxylate (meth)acrylate, isononyl (meth)acrylate, 1,6-hexanediol (meth)acrylate, isobornyl (meth)acrylate, 2-(2-ethoxyethoxy)ethyl (meth)acrylate, 2-ethylhexyl (meth) acrylate, lauryl (meth)acrylate, beta-carboxyethyl (meth) acrylate, butyl (meth)acrylate; isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth) acrylate, (meth)acrylic acid, N-vinylcaprolactam, stearyl (meth)acrylate, hydroxy functional caprolactone ester (meth) acrylate, octodecyl (meth)acrylate, isooctyl (meth)acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like.

Illustrative embodiments of the resin preferably include from about 10 to 80 parts by weight of reactant(s) (c) per 100 parts by weight of the reactants used to form the resin.

The resins useful in the aqueous compositions may be polymerized from the constituent reactants using a variety of suitable polymerization techniques that are currently known or hereafter developed. These techniques are further described in U.S. Pat. Pub. No. 2007/0110981 A1, (dated 17 May 2010).

According to one illustrative polymerization strategy, the resins preferably are prepared through chain-growth polymerization using one or more ethylenically unsaturated monomers. The polymerization reaction may be performed at a variety of temperatures, e.g., a temperature in the range of about 10° C. to 200° C. Preferred resins are latex polymers which are typically prepared with one or more water-soluble free radical initiators. Initiators suitable for use in the final resin composition will be known to persons having ordinary skill in the art or can be determined using standard methods. Representative water-soluble free radical initiators include hydrogen peroxide; tert-butyl peroxide; alkali metal persulfates such as sodium, potassium and lithium persulfate; ammonium persulfate; and mixtures of such initiators with a reducing agent. Representative reducing agents include sulfites, such as alkali metal metabisulfite, hydrosulfite, and hyposulfite; sodium formaldehyde sulfoxylate; and reducing sugars such as ascorbic acid and isoascorbic acid. The amount of initiator is preferably from about 0.01 to 3 wt. %, based on the total amount of monomer. In a redox system the amount of reducing agent is preferably from 0.01 to 3 wt. %, based on the total amount of monomer.

Preferred latex polymers are typically stabilized by one or more nonionic or anionic emulsifiers, used either alone or in combination. Emulsifiers suitable for use in the final topcoat composition will be known to persons having ordinary skill in the art or can be determined using standard methods. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)lauramide, N-lauryl-N-polyoxyethylene(3)amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium, potassium, lithium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$-$C_{16}$) sulfonate, sulfates of hydroxyalkanols, tetrasodium N-(1,2-dicarboxy ethyl)-N-octadecylsulfosuccinamate, disodium N-octadecylsulfosuccinamate, disodium alkylamido poly-ethoxy sulfosuccinate, disodium ethoxylated nonylphenol half ester of sulfosuccinic acid and the sodium salt of tert-octylphenoxyethoxypoly(39)ethoxyethyl sulfate.

In some embodiments, the aqueous composition is in the form of a latex composition. The latex composition may comprise single stage and/or multistage latex polymers. Preferred single-stage latex polymers have a glass transition temperature (Tg) of at least −5° C., more preferably at least 15° C., and most preferably at least 25° C., and optimally at least 30° C. Preferred single-stage latex polymers for use have a Tg of less than 75° C., more preferably less than 65° C., and most preferably less than 55° C. Tg may be determined in the practice of the present invention using differential scanning calorimetry (DSC) techniques.

Preferred multistage latex polymers have between 10 and 50 wt. % hard segments and between 50 and 90 wt. % soft segments. The hard segment preferably has a Tg between 35 and 70° C., more preferably between 35 and 130° C. and the soft segment preferably has a Tg between 0 and 30° C.

It may also be advantageous to use a gradient Tg latex polymer made using continuously varying monomer feeds. The resulting polymer will typically have a DSC curve that exhibits no Tg inflection points, and could be said to have an essentially infinite number of Tg stages. For example, one may start with a high Tg monomer feed and then at a certain point in the polymerization start to feed a low Tg soft stage monomer composition into the high Tg hard stage monomer feed. The resulting multistage latex polymer will have a gradient Tg from high to low. In other embodiments, it may be favorable to feed a high Tg hard stage monomer composition into a low Tg soft stage monomer composition. A gradient Tg polymer may also be used in conjunction with multiple Tg polymers.

In addition to the free radically polymerizable resin(s) as described herein, the resin component optionally may include one or more other kinds of resin components. Preferably these are substantially miscible with the free radically polymerizable resin(s) so that undue phase separation among resins is substantially avoided. Examples of other resins include polyurethanes, polyamides, polyimides, halogenated polymers, polysilicones, polyesters, alkyds, polyolefins, (meth)acrylic resins, combinations of these and the like.

In addition to the one or more resins included in the resin component, the aqueous coating composition generally includes at least one kind of non-binder particles (also referred to as pigments). These are added to help adhesion, to help control application properties, and the like. Additionally, non-binder particles may be added to the coating to serve one or more of the functions described below with respect to optional additional ingredients. These particles(s) may be organic and/or inorganic. Inorganic particles are more preferred. The particles may have a variety of shapes such as being platelet-shaped, acicular, oblong, rounded, spherical, irregular, combinations of these and the like.

In many preferred embodiments, the aqueous coating composition includes a sufficient amount of non-binder particles (preferably inorganic particles) such that a resultant coating prepared from the coating composition includes from about 15 to 85, preferably about 20 to 80, more preferably about 25 to 80 volume percent of the particles based on the total volume of the dry coating. Such non-binder particles are distinct from film-forming particles, e.g., film forming latex polymer particles, in that film-forming particles substantially coalesce and help to form part of the binder matrix in the resultant coating. Thus, the term "non-binder" with respect to the particles indicates that the particles retain at least a portion and preferably substantially all of their particulate character, either individually or as agglomerates or aggregates when incorporated into the resultant coating. Preferred non-binder particles are substantially non-film forming under the conditions used to form the resultant coating. To the extent that any portions of such particles might protrude from the coating surface, those protruding portions are deemed to be part of the pigment volume for purposes of calculating the pigment volume concentration (PVC) of the particles in the coating.

Optionally, at least a portion of pigment content of the aqueous coating composition includes one or more platelet-shaped pigment particles. As used herein, a platelet-shaped particle has an aspect ratio of the X:Y:Z dimensions of greater than 3:3:1, and preferably greater than 10:10:1. A non-platelet-shaped particle, therefore, has an aspect ratio of the X:Y:Z dimensions of 3:3:1 or less. Thus, a particle whose aspect ratio is 10:12:1 would be a platelet, but particles having an aspect ratio of 12:2:3 or 2:2:1 would not be platelet-shaped.

Platelet particles have excellent thickening properties, provide excellent sag resistance, and also provide improved application performance. In contrast, if only non-platelet-shaped particles were to be used in the aqueous coating composition, an unduly excessive amount of such nonplatelet particles might have to be used to achieve a desired level of thickening and/or sag resistance.

Examples of platelet-shaped pigments include one or more of a clay such as china clay, mica, talc, kaolin, micaceous iron oxide (MIO), combinations of these, and the like. China clay advantageously has less of an impact upon gloss than do many other platelet-shaped particles, which is beneficial when higher gloss top coatings are desired.

The size of platelet particles may vary over a wide range, ranging from finely sized particles to coarse particles. In illustrative embodiments, platelet particles may have a size in the range from about 0.5 micrometers to 50 micrometers, preferably about 1 to 10 micrometers, more preferably about 3 to 5 micrometers.

If platelet-shaped particles are used, it is desirable in some modes of practice that the entire pigment content of the aqueous coating composition is not all in the form of only platelet-shaped particles. Accordingly, in some embodiments, the pigments of the aqueous coating composition desirably include at least one kind of non-platelet-shaped particle used in combination with at least one kind of platelet-shaped particle.

A wide variety of non-platelet-shaped particles could be used in combination with platelet-shaped particles. Examples include one or more insoluble sulfates; one or more insoluble carbides; one or more insoluble nitrides; one or more insoluble oxynitrides; one or more insoluble oxycarbides; one or more insoluble oxides; one or more insoluble carbonates; one or more insoluble silicates, combinations of these and the like. Examples of these include sulfates, carbides, nitrides, oxides, oxynitrides, oxycarbides, and/or carbonates of one or more of Be, Mg, Ca, Sr, Ba, Al, Ti, a transition metal, a lanthanoid series metal, an actinoid series metal, Si, Ge, Ga, Al, Sn, Pb, combinations of these, and the like. Specific embodiments of such particles include BaSO4, titania, SiC, SiN, TiC, TiN, calcium carbonate, silicone dioxide, aluminum oxide, aluminum silicate, potassium aluminum silicate, aluminum hydroxide, wollastonite, combinations of these, and the like. BaSO4 is preferred in many formulations. This pigment helps to maintain gloss, helps thicken the aqueous coating composition while allowing air to escape, and helps provide resultant coatings with a desirable level of permeability so that moisture has good egress to and from the resultant coating.

The size of non-platelet particles may vary over a wide range, ranging from finely sized particles to coarse particles. In illustrative embodiments, non-platelet particles may have a size in the range from about 0.1 micrometers to 50 micrometers, preferably about 0.5 to 10 micrometers.

The weight ratio of platelet-shaped to non-platelet-shaped pigments can vary over a wide range. In illustrative embodiments, this ratio may be in the range from about 1:50 to 50:1, preferably about 1:10 to 10:1; more preferably about 1:3 to 3:1. For example, one embodiment of a aqueous coating composition includes about 14.5 weight percent of relatively rounded BaSO4 particles and about 14.5 percent by weight of platelet-shaped china clay based on the total weight of the coating solids.

Additional particulate components of the aqueous coating composition may be in the form of one or more additional ingredients described below.

The resin component is in admixture with in an aqueous fluid carrier. As used herein, "aqueous" means that at least about 5 weight percent, preferably at least about 20 weight percent, more preferably at least about 40 weight percent, and even more preferably at least about 60 weight percent of the carrier, and even 90 weight percent or more is water, based upon the total weight of the carrier. Most preferably, from about 85 to 100 weight percent, more preferably about 95 to 99 weight percent is water.

In addition to water, the aqueous carrier of the aqueous coating composition optionally may include one or more additional, optional co-carriers. Co-carrier(s) may be used for a variety of purposes, including helping in film formation and/or paint stability. Examples of suitable co-carriers include butyl cellosolve, alcohol(s), such as butanol, coalescing agents (e.g., ester alcohol(s), such as the Eastman Texanol product and/or low VOC coalescents such as are described in U.S. Pat. Nos. 6,762,230 and 7,812,079), glycol ether(s), combinations of these, and the like. Desirably, so-called VOC-exempt co-carrier(s) are preferred.

The amount of co-carrier included in the first aqueous coating composition can vary over a wide range. The amount(s) to use will depend on factors including the type of co-carrier, the purpose for which the co-carrier is being added, the coating technique(s) that might be used to apply the first aqueous coating composition onto a substrate, and the like. In illustrative embodiments, the first aqueous coating composition may include from about 0.3 to 80 weight percent, desirably 0.3 to 15 weight percent, more desirably about 1 to 5 weight percent of co-carrier(s) based on the total weight of co-carrier and water included in the composition.

To further enhance heat resistance and to help keep a substrate cool, one or more agents that help reflect heat and electromagnetic energy and/or that resist absorbing heat and electromagnetic energy may be incorporated into the composition. Examples of these include agents described in Assignee's pending Application No. PCT/US2011/042801 filed Jul. 1, 2010. These may be incorporated into the coating in accordance with conventional practices currently known or hereafter developed.

In some embodiments, such reflecting or absorbing agents include non-infrared-absorptive colored pigments. Exemplary such pigments may be inorganic or organic in nature, and include but are not limited to those referred to in U.S. Pat. Nos. 6,454,848 (Sliwinski et al.), 6,616,744 B1 (Sainz et al.), 6,989,056 B2 (Babler) and 7,157,112 B2 (Haines) and in U.S. Patent Application Publication No. US 2005/0126441 A1 (Skelhorn). Inorganic pigments are especially desirable and include single or mixed metal oxides formed from a variety of metals, e.g., from aluminum, antimony, bismuth, boron, chromium, cobalt, gallium, indium, iron, lanthanum, lithium, magnesium, manganese, molybdenum, neodymium, nickel, niobium, silicon, tin, vanadium or zinc.

Exemplary metal oxides include $Cr_2O_3$, $Al_2O_3$, $V_2O_3$, $Ga_2O_3$, $Fe_2O_3$, $Mn_2O_3$, $Ti_2O_3$, $In_2O_3$, $TiBO_3$, $NiTiO_3$, $MgTiO_3$, $CoTiO_3$, $ZnTiO_3$, $FeTiO_3$, $MnTiO_3$, $CrBO_3$, $NiCrO_3$, $FeBO_3$, $FeMoO_3$, $FeSn(BO_3)_2$, $BiFeO_3$, $AlBO_3$, $Mg_3Al_2Si_3O_{12}$, $NdAlO_3$, $LaAlO_3$, $MnSnO_3$, $LiNbO_3$, $LaCoO_3$, $MgSiO_3$, $ZnSiO_3$, $Mn(Sb,Fe)O_3$ and mixtures thereof. Suitably metal oxides may have a corundum-hematite crystal lattice structure as described in the above-mentioned U.S. Pat. No. 6,454,848 B2, or may be a host component having a corundum-hematite crystalline structure which contains as a guest component one or more elements selected from aluminum, antimony, bismuth, boron, chromium, cobalt, gallium, indium, iron, lanthanum, lithium, magnesium, manganese, molybdenum, neodymium, nickel, niobium, silicon, tin, vanadium and zinc.

Black non-infrared-absorptive pigments are of particular interest due to the high infrared absorption of conventional carbon black pigments and the widespread use of carbon black pigments in conventional dark-tinted paints and stains. A variety of black non-infrared-absorptive pigments are commercially available, including mixed metal oxide pigments such as those supplied by Ferro Corporation under the COOL COLORS™ and ECLIPSE™ trademarks, for example V-778 COOL COLORS IR Black, V-780 COOL COLORS IR Black, V-799 COOL COLORS IR Black, 10201 ECLIPSE Black, 10202 ECLIPSE Black and 10203 ECLIPSE Black; mixed metal oxide pigments such as those supplied by Shepherd Color Company under the ARTIC™ trademark, for example ARTIC Black 376, ARTIC Black 10C909, ARTIC Black 411 and ARTIC Black 30C940; mixed metal oxide pigments such as those supplied by Tomatec America, Inc. under the numbers 42-707A and 707V10; and perylene-based or other organic colorants such as those supplied by BASF Corp. under the PALIOGEN™ trademark including PALIOGEN Black S 0084.

These same suppliers also provide non-infrared-absorptive colored pigments in a variety of hues other than black, typically under the same trademarks, and these may likewise be employed in the disclosed coating compositions. Exemplary non-infrared-absorptive non-black pigments include inorganic pigments such as iron oxide, magnesium silicates, calcium carbonate, aluminosilicates, silica and various clays; organic pigments including plastic pigments such as solid bead pigments (e.g., polystyrene or polyvinyl chloride beads); and microsphere pigments containing one or more voids (e.g., those discussed in U.S. Patent Application Publication No. US 2007/0043162 A1 (Bardman et al.).

Other exemplary non-infrared-absorptive pigments include EXPANCEL™ 551DE20 acrylonitrile/vinyl chloride expanded particles (from Expancel Inc.), SIL-CEL™ 43 glass micro cellular fillers (from Silbrico Corporation), FIL-LITE™ 100 ceramic spherical particles (from Trelleborg Fillite Inc.), SPHERICEL™ hollow glass spheres (from Potter Industries Inc.), 3M ceramic microspheres including grades G-200, G-400, G-600, G-800, W-210, W-410, and W-610 (from 3M); 3M hollow microspheres including 3M Performance Additives iM30K (also from 3M), INHANCET™ UH 1900 polyethylene particles (from Fluoro-Seal Inc.), and BIPHOR aluminum phosphate (from Bunge Fertilizantes S.A., Brazil).

The disclosed coating compositions may also contain non-infrared-absorptive non-colored pigments such as titanium dioxide and white zinc oxide, either of which if used without the presence of a colored pigment would provide a white rather than colored coating composition. The addition of such non-colored pigments to the above-mentioned non-infrared-absorptive colored pigments can provide tinted paints and stains having a lightened shade and improved hiding power. The compositions desirably are free of or substantially free of infrared-absorptive colored pigments, e.g., carbon black, black iron oxide, brown oxide and raw umber.

A wide variety of other additional ingredients optionally may be included in the aqueous coating composition if desired. Examples of these include one or more defoaming aids, grinding aids, wetting agents, surfactants, coalescing aids, processing aids, skid resistance agents, abrasion resistance agents, conductive agents, antistatic agents, coloring agents, anticorrosion aids, thickeners, sag resistant agents, plasticizers, antioxidants, ultraviolet stabilizers, biocides, fungicides, fillers, combinations of these, and the like. These can be used in accordance with conventional practices currently known or hereafter developed.

The aqueous coating composition can be made using a variety of techniques. Exemplary techniques are described below in the examples.

The coating systems of the present invention can be used to coat a wide variety of substrates. Exemplary substrates include natural and building materials, trucks, railcars, freight containers, flooring materials, walls, furniture, other building materials, motor vehicle components, aircraft components, marine components, machinery components, laminates, equipment components, appliances, packaging, and the like. Exemplary substrate materials include metals, metal alloys, intermetallic compositions, metal-containing composites, combinations of these, and the like. The coating compositions can be applied on new substrates or can be used to refurbish old substrates.

The coating compositions of the invention may be applied to substrates in a variety of ways. According to one illustrative mode of practice, a substrate to be coated is provided. The substrate may be bare or may be at least partially coated with a previous coating system. It may be desirable to clean the substrate to remove grease, dirt, and other contaminants. Pre-existing coatings may or may not be removed as well, depending upon the context. When the substrate is ready, the aqueous coating composition is applied to at least a portion of the substrate surface and allowed to dry. One or more additional coats of the aqueous coating composition can be applied if desired. Often, a single coating is suitable.

The coating compositions of the present invention may be used to form top coatings having a wide range of thicknesses. In illustrative embodiments, primer coatings have a dry film thickness in the range from about 15 to 200 micrometers, preferably about 15 to 100 micrometers, more preferably about 30 to 50 micrometers.

The coating system of the present invention is particularly suitable for forming protective coatings on cargo containers. Preferably, the coating system is used with cargo containers involved in intermodal freight transport. Many of such containers at least substantially conform to an international standard applicable to cargo containers that are transported by at least one of a marine cargo system that transports cargo across waterways, a system that transports cargo along a railway, and/or a system that transports cargo along a roadway. Such containers are often exposed to extreme environments in terms of weather exposure, salt water exposure, fresh water exposure, heat from the sun, and the like during their service lives. Even though such containers often may be made from corrosion-resistant materials such as stainless steel and/or weathering steel, further decoration and/or protection against abrasion, corrosion, and the like is needed.

Conventionally, there has been a strong bias in the industry to only use solvent based coating systems to protect cargo containers. The bias is that water-based coatings lack the kind of performance needed to survive in this challenging environment, and the water-based coatings are difficult to apply and achieve a coating with reduced defects. Surprisingly, the present invention provides a water-based coating system that shows excellent performance when used to decorate or protect such cargo containers. Resultant top coats survive challenging industry tests normally satisfied only by solvent-based systems for the most part. For instance, the coatings of the present invention pass applicable salt spray testing standards for moisture resistance and provide excellent application characteristics.

Figure 2:
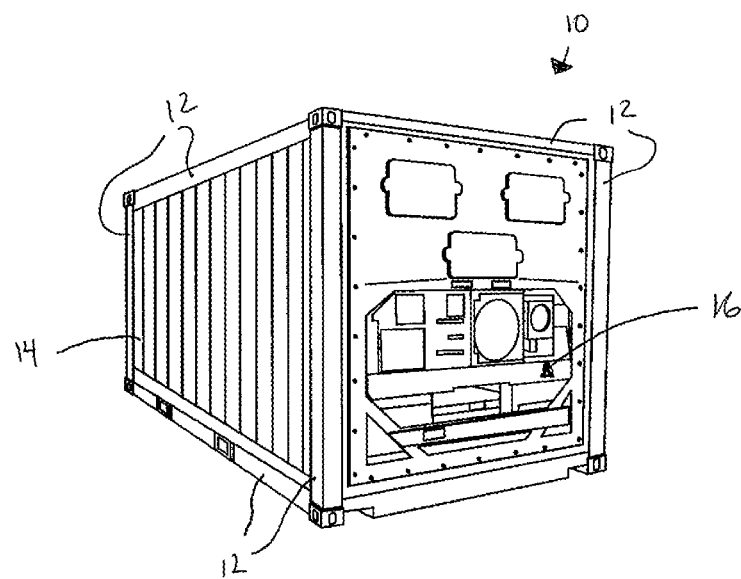
FIG. 2 is an alternative perspective view of the container of FIG. 1 showing an end of the container including refrigeration components.

An exemplary intermodal cargo container 10 shown in FIGS. 1 and 2 is often referred to in the industry as a refrigerated cargo container. These containers generally include a frame 12 defining the boundary of the container 10. The frame 12 is often made of a metal, metal alloy, intermetallic composition, metal composite, combinations of these, and the like. Due to its corrosion resistance, weathering steel often is used to make all or a portion of the frame 12. In a manner similar to aluminum, weathering steel oxidizes on the surface, but then this oxidation forms a barrier to protect the underlying steel from further corrosion. According to ASTM standards, weathering steel is available in grades including A242, A588, and A602.

Wall, floor, and ceiling panels 14 are attached to the frame 12 such as by bolts, welding, rivets, or the like. Welding tends to be widely used to provide cost-effective, weather-tight attachment. The panels 14 can be made from a wide variety of metals, metal alloys, intermetallic compositions, or other metal-containing materials. In many embodiments, at least portions of the wall, floor, and/or ceiling panels 14 are fabricated from stainless steel. Muffler grade stainless steel is used widely in the industry to fabricate the panels of refrigerated cargo containers.

In a typical mode of manufacture of refrigerated cargo container 10, the frame 12 is protected against corrosion such as by coating the frame 12 with metalized zinc (galvanizing) or by coating with a Zn-rich primer. Stainless steel wall panels 14 may be welded to the frame 12 before or after the frame 12 is protected against corrosion. If the panels 14 are welded to the frame 12 prior to providing the frame 12 with corrosion protection, the stainless steel wall panels 14 generally are not coated with the corrosion protection, except that a small boundary region of the panels 14 adjacent to the frame 12 may be coated as a matter of convenience to help ensure full coverage of the frames 12. By way of example, such a boundary region may have a width of about 0.5 cm to 10 cm.

Additionally, if a Zn-rich primer is used to coat frames 12, it is desirable to isolate the Zn-rich primer from water in the ambient atmosphere. Accordingly, a waterproof coating desirably is applied onto at least a portion and preferably substantially all of the underlying coating that includes Zn as a constituent. Two-part epoxy compositions are widely used to form a waterproof coating over the underlying primer. Conventionally, the epoxy coating would be formed not only on the frames 12 bearing the Zn-rich primer, but the epoxy coating also would have been formed over the entirety of the wall panels 14 as well. Due to the difficulty of adhering top coatings to stainless steel, coating the exposed stainless steel surfaces with the epoxy has helped in the past to provide a surface that is more compatible with top coatings.

The top coatings of the present invention, in contrast, show excellent adhesion when applied directly onto exposed stainless steel surfaces, including muffler grade stainless steel. An intervening coating that promotes adhesion to the stainless steel is not needed, although such an adhesion promoting coating could be used, if desired. In the practice of the present invention, it is more efficient, faster, and more economical if the stainless steel panels generally are not coated with the epoxy primer.

Accordingly, in some modes of practice the waterproof epoxy primer is applied onto the container 10 so that at least a portion of the stainless steel surface(s) generally remains exposed. In such embodiments, the waterproof coating is applied mainly over the underlying frames 12 with little, if any, other portions of the container surfaces being coated. In these embodiments, the stainless steel wall panels 14 desirably are not extensively coated with this primer, although a small boundary region of the panels adjacent to the frame may be coated as a matter of convenience. By way of example, such a boundary region, if any, may have a width of about 0.5 cm to 10 cm.

Thus, after applying the epoxy primer, the cargo container 14 typically includes at least two kinds of surfaces. A first surface portion corresponds to the frames 12 coated with the epoxy primer while a second surface portion includes exposed stainless steel on panels 14.

Next, an aqueous coating composition of the present invention is used to form a coating on at least portions of the first and second surface portions. More preferably, at least substantially the entire exterior of the cargo container 10 is coated with the aqueous coating composition. The composition may be applied using any suitable technique, such as by brushing, spraying, spin coating, roll coating, curtain coating, dipping, gravure coating, and/or the like. The resultant coating shows excellent adhesion to both the surface portions. Optionally, the interior of container 10 can be coated using similar strategies.

Desirably, the coatings of the present invention are applied using either airless or air-assisted airless spray techniques. Airless spray is a method of atomizing paint without the use of compressed air. The paint is pumped under high pressure to an airless spray gun, where the paint is forced at high pressure through the spray tip at the front of the gun. Airless spray allows for increased speed and less overlay. In air-assisted airless spraying, fluid pressure is provided by an airless pump and compressed air is introduced into the spray from an airless tip (nozzle) to improve the fineness of atomization. While speed and efficiency can be improved through the use of these techniques, a disadvantage to these techniques has been the possibility of entrapped air forming in the applied coating. Due to various surfactants and dispersants used in latex polymer based coatings, air entrapment has been very difficult to overcome. Surprisingly, this invention allows coatings to be prepared with substantially reduced defects when these spray techniques.

The resultant coating of the present invention shows excellent adhesion to both primed and unprimed metal surfaces. Thus, the present invention is particularly advantageous for forming top coatings directly on stainless steel surfaces without requiring the use of an intervening tie layer. The fact that the present invention achieves this adhesion with a water-based composition is particularly advantageous and unexpected, as even conventional solvent-based coating systems have had adhesion issues with respect to stainless steel surfaces.

In some modes of practice, the refrigeration components 16 are incorporated into the container 10 after which the container 10 will be further protected by a coating system. In other instances, the refrigeration components 16 are incorporated into the container 10 after a coating system is applied to the other parts of the container 10. The manufacturer, the user, or another entity in the chain of distribution may apply the protective coating system. The doors 18 may be protected by the same or different coating system. Often the doors 18 are prepared separately and then installed onto the container 10 after container coating is finished.

Some embodiments of the aqueous coating compositions can be used to form top coatings on other kinds of substrate surfaces. For example, the aqueous coating compositions can be used to form top coatings over underlying primer layers incorporating one or more chlorinated resins as described in Assignee's co-pending application WATER-BASED COATING SYSTEM WITH IMPROVED MOISTURE AND HEAT RESISTANCE filed concurrently herewith. This application describes forming such coatings over dry cargo containers, for instance.

The present invention will now be described with reference to the following illustrative examples.

EXAMPLE 1

Waterborne Topcoat Formulations

The following ingredients are charged to a high speed mixing vessel. All listed amounts are parts by weight unless otherwise noted.

TABLE 1a

| Raw material | Vendor | Run 1 | Run 2 |
| --- | --- | --- | --- |
| Aerosil 200 | Evonik | 0.4 | 0.4 |
| ASP 170 | BASF | 11.6 | 11.6 |
| Cimbar Ex | Cimbar | 11.6 | 11.6 |
| Disperbyk 190 | BYK | 1.2 | 1.2 |
| EB Solvent | Eastman Chemicals | 0.9 | 0.9 |
| Foamaster SA-3 | Cognis | 0.3 | 0.3 |
| Tiona 595 | Cristal | 9.6 | 5 |
| Water | | 4.3 | 4.3 |

The mixture is dispersed at high speed to a grind of 6.5 Hegman, then letdown with the following mixture of Table 1b.

TABLE 1b

| Acrysol RM-8W | Rohm & Haas | 1.4 | 1.4 |
| --- | --- | --- | --- |
| Ammonium Hydroxide | Ashland | 0.5 | 0.5 |
| EPS2568 | E.P.S. | 43.3 | 43.3 |
| Foamaster SA-3 | Cognis | 0.4 | 0.4 |
| Texanol | Eastman Chemicals | 2.2 | 2.2 |
| Water | | 16.9 | 16.9 |

The top coat of Run 1 has relatively high pigment to binder ratio and is a white color. The top coat of Run 2 has relatively high pigment to binder ratio with a reduced white pigment loading for less hiding powder.

EXAMPLE 2

Solvent Based Primer Over Metalized Zinc Frame

The following ingredients are charged to a high speed mixing vessel. All listed amounts are parts by weight unless otherwise noted.

TABLE 2a

| Raw material | Vendor | Run 1 |
| --- | --- | --- |
| Cimbar Ex | Cimbar | 6.6 |
| Epon 1001-X-75 | Hexion | 20.6 |
| Hubercarb W3N | Huber | 26.3 |
| Lampblack LB-1011 | Rockwood | 0.2 |
| Lecithin Soya | | 0.3 |
| Suspeno 201 NBA | Poly Resyn | 0.9 |
| Tiona 595 | Cristal | 9.2 |
| Xylene | Citgo | 5.6 |

The mixture is dispersed at high speed to a grind of 5.5 Hegman, then letdown with the following mixture of Table 2b.

TABLE 2b

| Aromatic 150 | Exxon | 2.9 |
| --- | --- | --- |
| EB Solvent | Eastman Chemicals | 4.7 |
| Epon 1001-X-75 | Hexion | 2.8 |
| Xylene | Citgo | 13.7 |

The mixture below in Table 2c is added to the mixture from Table 2a and 2b prior to applying the coating at the point of use.

TABLE 2c

| Versamine F-11 | Cognis | 4.1 |
| --- | --- | --- |
| Xylene | Citgo | 1.5 |
| Iso Butyl Alcohol | Ashland | 0.7 |
| DMP 30 | Air Products | 0.1 |

The coating described in this example is a conventional, solvent-based coating used in the container industry for a middle coat over a zinc rich primer with respect to refrigerated cargo containers. In one mode of practicing the present invention, this coating is used to provide a waterproof barrier over at least the corrosion-protected frames. Optionally, this material can be applied over the entire container prior to applying the water-based topcoat of the invention.

EXAMPLE 3

Waterborne Topcoat

The following ingredients are charged to a high speed mixing vessel. All listed amounts are parts by weight unless otherwise noted.

TABLE 3a

| Raw material | Vendor | Run 1 |
| --- | --- | --- |
| Aerosil 200 | Evonik | 0.4 |
| Disperbyk 190 | BYK | 1.1 |
| EB Solvent | Eastman Chemicals | 0.9 |
| Foamaster SA-3 | Cognis | 0.3 |
| Tiona 595 | Cristal | 11.9 |
| Water | | 3 |

The mixture is dispersed at high speed to a grind of 6.5 Hegman, then letdown with the following mixture of Table 3b.

TABLE 3b

| Acrysol RM-8W | Rohm & Haas | 1.4 |
| --- | --- | --- |
| Ammonium Hydroxide | Ashland | 0.5 |
| EPS2568 | E.P.S. | 60.8 |
| Foamaster SA-3 | Cognis | 0.5 |
| Texanol | Eastman Chemicals | 2.2 |
| Water | | 17 |

EXAMPLE 4

Performance Testing

Performance testing of top coat compositions that are prepared in the above examples are reported in the following table. Both Run 1 and Run 2 of Example #1 exhibit acceptable application properties, allowing air to release from the film prior to curing without undue sagging or other detrimental coating defects either directly to the stainless steel or over the coating composition of Example #2. Example #2 applied over the metalized zinc or zinc primer on Corten steel is able to seal the zinc containing portion to allow Example #1 Run 1 and Run 2 to be successfully applied without undue blistering or other defects. When the lower pigment containing coating of Comparative Example A is applied over stainless steel, worse coating appearance is observed

| Description | Salt Spray Testing ASTM B117 | Water Soak 60 hours @ 77 degrees F. w/tap water | Adhesion ASTM D3359 |
| --- | --- | --- | --- |
| Ex #1 Run 1 * | No. 10 | No. 10 | 5B |
| Ex #1 Run 2 * | No. 10 | No. 10 | 5B |
| Ex #2 Run 1/ Ex#1 Run 1** | No. 10 | No. 10 | 5B |

| Description | Salt Spray Testing ASTM B117 | Water Soak 60 hours @ 77 degrees F. w/tap water | Adhesion ASTM D3359 |
|---|---|---|---|
| Ex #2 Run 1/ Ex#1 Run 2** | No. 10 | No. 10 | 5B |

*Note:
Substrate is muffler grade stainless steel (MGSS)
**Note:
Substrate is Corten steel Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of coating a cargo container, comprising the steps of:
providing a cargo container or one or more components thereof, wherein the cargo container conforms to ISO R-668, and wherein at least a portion of an exposed stainless steel surface of the cargo container or one or more components thereof includes weathering steel;
applying at least a coating composition to form a topcoat directly on at least the exposed stainless steel surface of the cargo container or one or more components thereof, wherein the coating composition comprises:
an aqueous carrier;
at least one film forming resin in admixture with the carrier;
and one or more pigments comprising non-binder particles dispersed in the coating composition.

2. The method according to claim 1, wherein the coating composition comprises from about 10 to 70 weight percent of at least one film forming resin.

3. The method according to claim 1, wherein the carrier includes from about 0.3 to 15 weight percent of a co-carrier based on the total weight of the carrier.

4. The method according to claim 1, wherein at least one film forming resin is derived from an acid functional monomer, and is obtained from ingredients comprising (a) optionally, at least one aromatic reactant including pendant free radically polymerizable functionality; (b) at least one free radically polymerizable reactant having pendant acid functionality; and (c) optionally at least one other copolymerizable reactant with free radically polymerizable functionality.

5. The method according to claim 1, wherein the one or more pigments are selected from the group consisting of $BaSO_4$, $CaCO_3$, clay, china clay, mica, talc and mixtures thereof.

6. The method according to claim 1, wherein the pigment volume concentration of the non-binder particles in the corresponding dry coating is in the range from about 15 to 85 volume percent.

* * * * *